UNITED STATES PATENT OFFICE.

HENRY V. DUNHAM, OF BELLOWS FALLS, VERMONT, ASSIGNOR TO CASEIN COMPANY OF AMERICA, A CORPORATION OF NEW JERSEY.

PROCESS OF PRECIPITATING AND PRESERVING CASEIN.

No. 814,594.     Specification of Letters Patent.     Patented March 6, 1906.

Application filed May 4, 1905. Serial No. 258,882.

*To all whom it may concern:*

Be it known that I, HENRY V. DUNHAM, a citizen of the United States, residing at Bellows Falls, in the county of Windham and State of Vermont, have invented or discovered a certain new and useful Process for Precipitating and Preserving Casein, of which the following is a specification.

In the production of casein for use in the arts in accordance with the processes now in use it is necessary in order that the product may be kept in good condition that the casein be dried almost immediately after it has been precipitated from the milk, and to this end many of the creameries where casein is produced are provided with drying plants for the purpose of drying the casein in order to render it suitable for keeping as long as may be necessary before being used. It is, however, not economical to provide many of the smaller creameries with drying plants, which are somewhat expensive, and it has heretofore been customary to ship the wet casein from such creameries to other creameries which are provided with drying plants, where the wet casein may be properly dried; but as it is impossible to ship freshly-precipitated wet casein (which even after it has been pressed contains fifty per cent. or more of water) for any considerable distance, or keep it for any considerable length of time—say for more than two or three days—without its becoming putrid much loss frequently occurs by reason of decomposition or spoiling of the casein.

This invention or discovery has for its object to obviate the difficulty above referred to by providing a preservative precipitant for the casein which will so act upon the casein in the precipitating process that wet casein will be kept from decomposing for a very considerable length of time and can therefore be shipped long distances in safety.

The invention or discovery is carried into effect by mixing a preservative with the precipitating acid. The acids usually employed for precipitating casein are sulfuric or hydrochloric acids, although acetic or other acids may likewise be used, and the preservative which is preferably employed in connection with the precipitating acids is boracic acid, which is simply mixed with the precipitating acid in a proportion of one-half of one per cent. to about one per cent., or a little more, of the boracic acid to the precipitating acid. The preserving boracic acid may be mixed with the precipitating acid, and the mixture may then be shipped to any place at which it is to be used in the usual manner for precipitating casein from milk, or the mixture of the preservative with the precipitating acid may be made at the creameries or factories where the precipitating is to be done.

In carrying the invention into effect the precipitating acid mixed with the preservative is applied to the milk in a proportion of from three to five per cent. in the usual manner in precipitating casein, and as the casein is precipitated the preservative acts upon the same in such a manner as to render the casein proof against decomposition for a very considerable length of time, and thus enables the casein to be shipped for long distances in safety or to be kept until it is convenient to submit it to the action of the driers in drying it out.

Having thus described my invention or discovery, I claim and desire to secure by Letters Patent—

1. The herein-described process for precipitating and preserving casein, consisting in precipitating the casein with an acid with which a small percentage of a preservative has been previously mixed.

2. The herein-described process for precipitating and preserving casein, consisting in precipitating the casein with an acid with which a small percentage of boracic acid has been previously mixed.

In testimony whereof I affix my signature in presence of two witnesses.

HENRY V. DUNHAM.

Witnesses:
     WILLIAM W. ALLEN,
     FRANCIS A. McGREEN.